United States Patent Office 2,709,178
Patented May 24, 1955

2,709,178

N.N'-TETRA-ACETIC ACIDS

Hans Schläpfer, Basel, and Jakob Bindler, Riehen, near Basel, Switzerland, assignors to J. R. Geigy A. G., Basel, Switzerland, a Swiss firm No Drawing. Application October 15, 1951,
Serial No. 251,458

Claims priority, application Switzerland October 24, 1950

3 Claims. (Cl. 260—534)

It is known that organic nitrogen compounds with more than one —$CH_2$—COOH group at a basic nitrogen atom have the power to hinder the formation of earth alkali, earth and heavy metal salt precipitates. They can also re-disssolve any precipitates of these metals which have already formed. Ethylene diamine - N.N' - tetra-acetic acid is particularly prominent in the group of active substances which are of great service to the textile industry in making the salts causing water hardness non-injurious to the goods. All other aliphatic N-polyacetic acids which have been suggested are of less importance and generally of much less activity than this compound.

Most surprisingly it has now been found that the N.N'-tetra-acetic acids from $\omega.\omega'$-diaminoethylene ethers of the general formula:

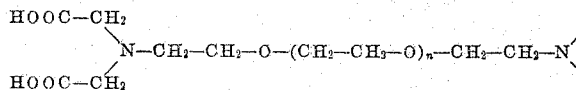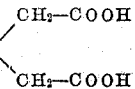

wherein the index $n$ has the value of 0 or a very small whole number, possess the valuable properties described above to a very excellent degree. It is particularly surprising that the compounds according to this invention are, in spite of their higher molecular weights, equal in their action to ethylene diamine-N.N'-tetra-acetic acid and, under certain circumstances, are even superior.

The new compounds are obtained from primary $\omega.\omega'$-diamino compounds of ethylene mono- or poly-ethers, in the latter case preferably lower polyethers, by reacting 1 mol of ether with at least 4 mols of a substituted acetic acid or its salts which is or are reactive in the $\alpha$-position. Instead of the free carboxylic acid, substituted derivatives with a modified carboxyl group which are reactive in the $\alpha$-position and which can finally be converted into the free carboxyl group can also be used. The mono-chloro-acetic acid and monobromo-acetic acid can be named as substituted acetic acids which are reactive in the $\alpha$-position. Their esters or nitriles and also the formaldehyde cyanohydrin come into question as substituted derivatives with a modified carboxyl group which are capable of reaction in the $\alpha$-position. Also mixtures of aldehyde and hydrocyanic acid can be used instead of the cyanohydrins. The modified carboxyl groups are converted into free carboxyl groups by acid, or preferably, alkaline saponification.

Because of their easy accessibility, chiefly di-($\beta$-aminoethyl)-ether, and di-($\beta$-aminoethyl)-glycol ether come into question as primary $\omega.\omega'$-diamino compounds of ethylene mono- or poly-ethers usable according to the invention. However, higher diprimary $\omega.\omega'$ - diamino - polyethylene polyethers can also be used. As examples may be named: $\omega.\omega'$ - diamino - tetra - ethylene - tri-ether, $\omega.\omega'$-di-amino-penta-ethylene-tetra-ether and also technical mixtures of such $\omega.\omega'$-diamino-polyethylene-polyethers.

The new aliphatic N.N'-tetra-acetic acids are white powders, the alkali salts of which dissolve very well in water. They are able to hold those salts which cause hardness of water in solution in a complex bond or to re-dissolve precipitates which have already formed so that they are very suitable for this purpose in the textile and textile auxiliary products industries. In particular in an alkaline-aqueous medium they have a capacity to form complexes with alkaline earth, so that, for example, they may be used as additives to soap.

The individual compounds according to the invention often have a specifically different behaviour to certain earth alkali ions so that the analytical determination thereof can be done at the same time. Thus, for example, ethylene glycol - bis - ($\beta$ - aminoethyl ether)-N.N'-tetra-acetic acid can serve for the titrimetric determination of calcium as well as strontium.

The following examples serve to illustrate the production and use of the new compounds, without, however, limiting the invention in any way. Where not otherwise observed, parts are given as parts by weight and the temperatures are in degrees centigrade.

Example 1

416 parts of chloro-acetic acid are dissolved in 900 parts of water and on cooling to a maximum temperature of 10° are neutralised with 587 parts of 30% caustic soda lye. 104 parts of $\beta.\beta'$-diaminodiethyl ether are then added and the reaction solution is warmed in a water bath to 60°. Care should be taken that the reaction always remains weakly phenolphthalein alkaline by the dropwise addition of a further 587 parts of 30% caustic soda lye. The exothermic reaction is kept at a temperature of 70–75° by cooling the reaction solution from time to time. After all the caustic soda lye has been added, the reaction is completed by heating for a further 5 hours at 90–95°. After filtration of the reaction solution, 30% hydrochloric acid is added until a weakly acid reaction to Congo red is obtained and then the whole is stirred at a moderate temperature with about 2500 parts of methanol. On standing for a fairly long time, the tetra-acetic acid which has formed slowly separates out. $\beta.\beta'$-diaminodiethyl ether-N.N'-tetra-acetic acid is obtained in a pure form on recrystallization from aqueous alcohol.

The compound has a great capacity to form complexes with earth alkali ions and is suitable, therefore, for holding salts causing hardness of the water in a complex bond or for re-dissolving precipitates which have been caused by earth alkali ions.

$\beta\beta.'$-diaminodiethyl ether can be reacted in a similar manner by the use of chloro- or bromoacetic acid ethyl ester in an organic solvent, and, after saponification of the carbethoxy groups, yields $\beta.\beta'$-diaminodiethyl ether-N.N'-tetra-acetic acid.

Example 2

200 parts of chloro-acetic acid are dissolved in 450 parts of water and on cooling to a maximum temperature of 10° are neutralised with 193 parts of 46% caustic soda lye. 74 parts of ethylene glycol-bis-$\beta$-aminoethyl ether are then added and the reaction solution is heated to 60°. During the reaction, which is performed advantageously at 70–75°, care should be taken to ensure that there is always an alkaline reaction by the dropwise addition of 193 parts of 46% caustic soda lye. On slowing down of the exothermic reaction, the reaction is completed by heating for a further 5 hours at 90–95°. The reaction solution is then filtered and made acid to Congo red by the addition of conc. hydrochloric acid. After a short time, the ethylene glycol-bis-β-aminoethyl ether-N.N'-tetra-acetic acid precipitates as coarse crystals.

The new tetra-acetic acid, when compared with earth alkali ions, has a specific capacity for complex formation and, apart from its use for rendering harmless those salts causing water hardness, it is also suitable for the simultaneous determination of earth alkali ions by titration.

Determination of content by electrometric titration with $n/10$ caustic soda lye in the presence of calcium chloride gives a degree of purity of 99%. The capability to form a calcium complex compound corresponds to 257–261 mg. calcium carbonate per 1 g. of the above acid. The purity of the compound is therefore 97.7–99.2%. These figures are obtained by titration of the tetra sodium salt in water with a 0.5 molar calcium chloride solution in the presence of ammonium oxalate until clouding occurs by the formation of calcium oxalate.

Example 3

39 parts of diethylene glycol-bis-β-aminoethyl ether are added to a solution of 103 parts of sodium chloracetate in 250 parts of water and the solution is heated to 65°. Care is taken always to keep a weak phenolphthalein alkaline reaction by the dropwise addition of 105 parts of 37.5% caustic soda lye. The temperature is kept at 70–75° by partial cooling. The reaction is completed by heating for 5 hours at 90–95°. Animal charcoal is added, the colourless solution is filtered off and made up to 700 parts. To find the content, the ability to bind calcium is determined with 0.5 molar calcium chloride solution as follows:

27.5 g. of the aqueous solution of the tetra sodium salt are titrated with a 0.5 molar calcium chloride solution in the presence of ammonium oxalate until clouding occurs by the precipitation of calcium oxalate. 14.5 ccm. calcium chloride solution are used. From this the capability to bind calcium is found to be 263.7 mg. calcium carbonate for 10 g. of the aqueous solution obtained according to the above example which corresponds to a yield of 92.4% tetra-acetic acid calculated on the diamine used.

The free tetracarboxylic acid can only be obtained in crystalline form with difficulty from the aqueous solution of the sodium salt and has only a non-typical decomposition point.

The diethylene glycol-bis-β-aminoethyl ether used in the example is obtained from ω.ω'-dichlorotetra-ethylene glycol ether according to Gabriel's method. It boils at 124–127° and 1.7 mm. Hg.

Example 4

30.4 parts of ethylene glycol-bis-β-aminoethyl ether-N.N'-tetra-acetonitrile, obtained by the method known per se from ethylene glycol-bis-β-aminoethyl ether, formaldehyde and hydrocyanic acid, are heated under reflux at 90–105° with 120 parts of 16.7% caustic soda lye until no more ammonia is given off. The solution is then diluted a little and the tetraacetic acid is separated in the manner described in Example 2. A quantitative yield for practical purposes of tetra-acetic acid in the form of a white crystal powder separates after a short time.

If, instead of ethylene glycol-bis-β-aminoethyl ether-N.N'-tetra-acetonitrile the corresponding tetra-acetonitrile of β.β'-diaminodiethyl ether is used, then a good yield of β.β'-diaminodiethyl ether-N.N'-tetra-acetic acid is obtained by saponification.

Example 5

41.3 parts of triethylene glycol-bis-β-aminoethyl ether (B. P. 148–155° at 0.8 mm. Hg) are added to a solution of 92 parts of sodium chloroacetate in 200 parts of water. The reaction is completed in the manner described in Example 3 with the aid of 95 parts of 37.5% caustic soda lye. The aqueous solution obtained is made up to 625 parts and the content is determined by electrometric titration in the presence of calcium chloride. A yield of 99% tetra-acetic acid is reckoned from the capability to bind the calcium ion calculated on the diamine used.

The triethylene glycol-bis-β-aminoethyl ether-tetra-acetic acid can only be obtained in crystalline form with difficulty with mineral acid from the aqueous solution of the tetra sodium salt and has only a non-typical decomposition point.

What is claimed is:

1. The N.N'-tetra-acetic acids of the general formula:

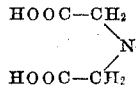 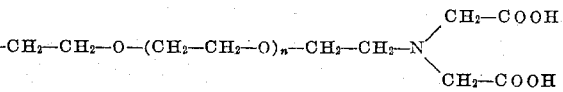

wherein $n$ represents an integer from 0 to 5.

2. The N.N'-tetra-acetic acid of the formula:

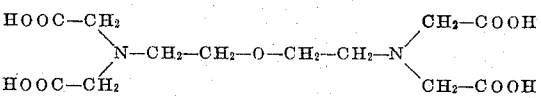

3. The N.N'-tetra-acetic acid of the formula:

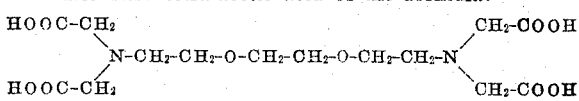

References Cited in the file of this patent

UNITED STATES PATENTS

| | | |
|---|---|---|
| 2,316,606 | Loder et al. | Apr. 13, 1943 |
| 2,413,856 | Bersworth | Jan. 7, 1947 |